(12) United States Patent
Bruin-Slot et al.

(10) Patent No.: US 12,157,294 B2
(45) Date of Patent: Dec. 3, 2024

(54) SCRIM LAYER ON INSULATION (71) Applicant: WHIRLPOOL CORPORATION, Benton Harbor, MI (US)

(72) Inventors: Zachary J. Bruin-Slot, Coloma, MI (US); Nathalie A. Phillips, Benton Harbor, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 0 days.

(21) Appl. No.: 17/857,646

(22) Filed: Jul. 5, 2022

(65) Prior Publication Data

US 2023/0027875 A1    Jan. 26, 2023

Related U.S. Application Data

(60) Provisional application No. 63/225,220, filed on Jul. 23, 2021.

(51) Int. Cl.
*B32B 3/24* (2006.01)
*B32B 3/26* (2006.01)
(Continued)

(52) U.S. Cl.
CPC ............ *B32B 5/275* (2021.05); *B32B 3/266* (2013.01); *B32B 5/022* (2013.01); *B32B 5/024* (2013.01); *B32B 5/028* (2013.01); *B32B 5/26* (2013.01); *B32B 5/262* (2021.05); *B32B 5/273* (2021.05); *B32B 7/022* (2019.01); *B32B 7/08* (2013.01); *B32B 7/12* (2013.01); *B32B 15/02* (2013.01); *B32B 15/14* (2013.01); *B32B 15/20* (2013.01); *B32B 17/02* (2013.01); *B32B 17/061* (2013.01); *B32B 17/067* (2013.01);
(Continued)

(58) Field of Classification Search
None
See application file for complete search history.

(56) References Cited

U.S. PATENT DOCUMENTS 349,183 A * 9/1886 Stewart ................ B29C 70/24
                                                442/52
383,599 A * 5/1888 Suhr ..................... E04C 2/043
                                                138/140
(Continued)

FOREIGN PATENT DOCUMENTS

AU    3024692 A  *  6/1993
CA     453274 A  * 12/1948
(Continued)

OTHER PUBLICATIONS

Machine Translation of JP-61084237-A, Apr. 1986 (Year: 1986).*
(Continued)

*Primary Examiner* — Jeffrey A Vonch
(74) *Attorney, Agent, or Firm* — Brooks Kushman P.C.

(57) ABSTRACT

A layered composite includes an insulation sheet and at least one scrim layer secured thereto. The at least one scrim layer may be embedded within the thickness of the insulation sheet, or bonded to a corresponding face of the insulation sheet, and have a tensile strength greater than that of the insulation sheet. As such, the scrim layer provides structural support to the insulation sheet as well as a trap for fibers or particles that may separate from the insulation sheet.

15 Claims, 2 Drawing Sheets

(51) Int. Cl.

| | |
|---|---|
| *B32B 5/02* | (2006.01) |
| *B32B 5/06* | (2006.01) |
| *B32B 5/26* | (2006.01) |
| *B32B 7/022* | (2019.01) |
| *B32B 7/08* | (2019.01) |
| *B32B 7/12* | (2006.01) |
| *B32B 15/02* | (2006.01) |
| *B32B 15/14* | (2006.01) |
| *B32B 15/20* | (2006.01) |
| *B32B 17/02* | (2006.01) |
| *B32B 17/06* | (2006.01) |
| *B32B 37/12* | (2006.01) |
| *B32B 38/00* | (2006.01) |
| *D04H 13/00* | (2006.01) |
| *F16L 59/02* | (2006.01) |
| *B29C 65/48* | (2006.01) |
| *B29C 65/56* | (2006.01) |
| *B32B 5/10* | (2006.01) |
| *D04H 1/4218* | (2012.01) |
| *D04H 1/4226* | (2012.01) |
| *D04H 1/58* | (2012.01) |
| *D04H 3/004* | (2012.01) |
| *F16L 59/08* | (2006.01) |

(52) U.S. Cl.
CPC ......... *D04H 13/001* (2013.01); *D04H 13/008* (2013.01); *F16L 59/026* (2013.01); *F16L 59/029* (2013.01); *B29C 65/48* (2013.01); *B29C 65/562* (2013.01); *B32B 5/06* (2013.01); *B32B 5/10* (2013.01); *B32B 5/265* (2021.05); *B32B 5/277* (2021.05); *B32B 37/12* (2013.01); *B32B 38/0004* (2013.01); *B32B 2250/02* (2013.01); *B32B 2250/03* (2013.01); *B32B 2250/20* (2013.01); *B32B 2250/40* (2013.01); *B32B 2260/021* (2013.01); *B32B 2260/046* (2013.01); *B32B 2262/101* (2013.01); *B32B 2262/103* (2013.01); *B32B 2307/304* (2013.01); *B32B 2307/416* (2013.01); *B32B 2307/54* (2013.01); *B32B 2307/554* (2013.01); *B32B 2307/5825* (2013.01); *B32B 2311/24* (2013.01); *B32B 2398/10* (2013.01); *D04H 1/4218* (2013.01); *D04H 1/4226* (2013.01); *D04H 1/58* (2013.01); *D04H 3/004* (2013.01); *D10B 2101/06* (2013.01); *F16L 59/08* (2013.01); *Y10T 156/1059* (2015.01); *Y10T 156/1069* (2015.01); *Y10T 156/13* (2015.01); *Y10T 428/24322* (2015.01); *Y10T 428/24331* (2015.01); *Y10T 428/24339* (2015.01); *Y10T 428/24347* (2015.01); *Y10T 428/24942* (2015.01); *Y10T 428/249923* (2015.04); *Y10T 442/10* (2015.04); *Y10T 442/102* (2015.04); *Y10T 442/109* (2015.04); *Y10T 442/121* (2015.04); *Y10T 442/129* (2015.04); *Y10T 442/133* (2015.04); *Y10T 442/138* (2015.04); *Y10T 442/143* (2015.04); *Y10T 442/153* (2015.04); *Y10T 442/159* (2015.04)

(56) References Cited

U.S. PATENT DOCUMENTS

| | | | | |
|---|---|---|---|---|
| 1,159,155 A * | 11/1915 | Ayres | ............... | B32B 5/26 156/305 |
| 1,721,461 A * | 7/1929 | Mazer | ............... | E04B 1/8409 442/13 |
| 1,823,405 A * | 9/1931 | Mazer | ............... | E04B 1/86 442/13 |
| 2,175,630 A * | 10/1939 | William | ............... | F16L 59/021 52/794.1 |
| 2,331,321 A * | 10/1943 | Heaton | ............... | D06N 7/0068 264/DIG. 75 |
| 2,409,951 A * | 10/1946 | Nootens | ............... | E04B 1/7666 156/551 |
| 2,543,101 A * | 2/1951 | Francis, Jr. | ............... | B32B 5/026 19/302 |
| 2,620,851 A * | 12/1952 | Brown | ............... | D04H 1/593 428/428 |
| 2,704,734 A * | 3/1955 | Draper | ............... | D04H 5/08 65/447 |
| 2,726,977 A * | 12/1955 | See | ............... | B32B 15/08 297/DIG. 5 |
| 2,943,010 A * | 6/1960 | Stefl | ............... | D04H 1/593 156/305 |
| 3,007,596 A * | 11/1961 | Matsch | ............... | E04B 1/803 62/54.3 |
| 3,198,687 A * | 8/1965 | Royet | ............... | E04B 1/80 442/13 |
| 3,356,561 A * | 12/1967 | Squire | ............... | C03C 25/68 28/112 |
| 3,448,823 A * | 6/1969 | Smith | ............... | G10K 11/16 181/290 |
| 3,682,755 A * | 8/1972 | Lee | ............... | B32B 7/04 442/352 |
| 3,948,295 A * | 4/1976 | Lemont | ............... | B32B 15/18 250/517.1 |
| 4,144,370 A * | 3/1979 | Boulton | ............... | B32B 5/024 28/103 |
| 4,499,134 A * | 2/1985 | Whitely | ............... | B32B 5/06 428/105 |
| 4,700,521 A * | 10/1987 | Cover | ............... | B32B 15/14 52/404.3 |
| 4,743,495 A * | 5/1988 | Lilani | ............... | B32B 5/06 442/388 |
| 4,777,086 A * | 10/1988 | Madden | ............... | B32B 15/09 428/920 |
| 4,885,886 A * | 12/1989 | Rosso | ............... | E04B 1/7658 52/404.3 |
| 4,917,750 A * | 4/1990 | Klose | ............... | D04H 1/00 156/254 |
| 4,943,465 A * | 7/1990 | Bailey | ............... | D21H 27/00 428/920 |
| 5,169,700 A * | 12/1992 | Meier | ............... | B64C 1/40 428/920 |
| 5,204,172 A * | 4/1993 | Gidley | ............... | B32B 25/10 442/232 |
| 5,302,445 A * | 4/1994 | DePetris | ............... | D06M 15/11 264/118 |
| 5,364,681 A * | 11/1994 | Pate | ............... | G10K 11/162 428/137 |
| 5,459,291 A * | 10/1995 | Haines | ............... | B32B 5/18 181/294 |
| 5,517,726 A * | 5/1996 | Beier | ............... | D04H 1/732 19/296 |
| 6,599,850 B1 * | 7/2003 | Heifetz | ............... | B32B 5/024 442/232 |
| 6,617,002 B2 * | 9/2003 | Wood | ............... | G10K 11/16 428/137 |
| 2002/0182967 A1 * | 12/2002 | Erb, Jr. | ............... | D04H 1/43835 428/920 |
| 2003/0116307 A1 * | 6/2003 | Amadio | ............... | E04B 1/7662 165/135 |
| 2004/0000112 A1 * | 1/2004 | Alderman | ............... | E04B 1/767 52/407.3 |
| 2005/0153616 A1 * | 7/2005 | Suda | ............... | B32B 5/26 442/394 |
| 2005/0215142 A1 * | 9/2005 | Bascom | ............... | D04H 1/42 442/352 |
| 2006/0046598 A1 | 3/2006 | Shah | | |
| 2007/0154695 A1 * | 7/2007 | Soriano | ............... | B32B 5/024 428/292.1 |
| 2007/0161310 A1 * | 7/2007 | Shope | ............... | B32B 5/024 442/181 |

(56) References Cited

U.S. PATENT DOCUMENTS

| | | | | |
|---|---|---|---|---|
| 2007/0261914 | A1* | 11/2007 | Wahlgren | F01N 1/24 |
| | | | | 181/252 |
| 2008/0229704 | A1* | 9/2008 | Augustyniak | E04C 2/246 |
| | | | | 52/794.1 |
| 2009/0140097 | A1* | 6/2009 | Collier | B32B 5/18 |
| | | | | 442/64 |
| 2009/0188091 | A1* | 7/2009 | Van Kerrebrouck | |
| | | | | D04H 1/5412 |
| | | | | 28/112 |
| 2010/0018981 | A1* | 1/2010 | Hyde | F16L 59/029 |
| | | | | 220/592.2 |
| 2011/0281060 | A1* | 11/2011 | Jorgensen | F16L 59/026 |
| | | | | 428/221 |
| 2012/0107547 | A1* | 5/2012 | Fernando | B32B 5/26 |
| | | | | 428/324 |
| 2013/0078422 | A1* | 3/2013 | Tinianov | B32B 5/26 |
| | | | | 442/381 |
| 2014/0273701 | A1* | 9/2014 | Samanta | C04B 26/06 |
| | | | | 252/62 |
| 2014/0356574 | A1* | 12/2014 | Conolly | B32B 5/026 |
| | | | | 204/192.15 |
| 2016/0122920 | A1 | 5/2016 | Hobbs et al. | |
| 2017/0305113 | A1* | 10/2017 | Sproule, III | B32B 5/16 |
| 2018/0005620 | A1* | 1/2018 | Bush | B32B 3/266 |
| 2018/0047380 | A1* | 2/2018 | Bush | B32B 7/12 |
| 2021/0197520 | A1* | 7/2021 | Li | B32B 7/02 |

FOREIGN PATENT DOCUMENTS

| | | | | |
|---|---|---|---|---|
| CN | 101460304 | A | | 6/2009 |
| CN | 105209248 | A | | 12/2015 |
| CN | 108468908 | A * | 8/2018 | ............ F16L 59/028 |
| CN | 207724971 | U * | 8/2018 | |
| CN | 112585008 | A | | 3/2021 |
| DE | 20119315 | U1 * | 2/2002 | ............ B23Q 1/015 |
| EP | 572891 | A1 * | 12/1993 | ............ B32B 5/022 |
| EP | 1832676 | A1 * | 9/2007 | ............ B32B 19/00 |
| EP | 2522502 | A1 * | 11/2012 | ............ B32B 15/02 |
| FR | 673738 | A * | 1/1930 | |
| FR | 781893 | A * | 5/1935 | |
| FR | 1344280 | A * | 11/1963 | |
| FR | 2719320 | A1 * | 11/1995 | ............ B32B 15/02 |
| GB | 2329864 | A * | 4/1999 | ............ B32B 5/00 |
| JP | 61084237 | A * | 4/1986 | |
| JP | 11058571 | A * | 3/1999 | |
| KR | 2018106376 | A * | 10/2018 | ............ B32B 15/14 |
| WO | WO-9321061 | A1 * | 10/1993 | ............ B63B 3/68 |
| WO | WO-9520707 | A1 * | 8/1995 | ............ D04H 1/4209 |
| WO | WO-2009104003 | A1 * | 8/2009 | ............ B32B 15/02 |
| WO | WO-2017134004 | A1 * | 8/2017 | ............ F16L 59/026 |
| WO | WO-2018002280 | A1 * | 1/2018 | ............ C03C 25/1095 |
| WO | WO-2018207008 | A1 * | 11/2018 | |
| WO | 2020/019114 | A1 | 1/2020 | |

OTHER PUBLICATIONS

Machine Translation of EP-572891-A1, Dec. 1993 (Year: 1993).*
Machine Translation of EP-1832676-A1, Sep. 2007 (Year: 2007).*
Zhang, In Woodhead Publishing Series in Civil and Structural Engineering, Building Materials in Civil Engineering: Chapter 12—Heat-insulating Materials and Sound-absorbing Materials, 2011, Woodhead Publishing, pp. 304-423 (Year: 2011).*
Machine Translation of CN-207724971-U, Aug. 2018 (Year: 2018).*
Extended EP Search Report for EP 22186126.6 dated Dec. 19, 2022, 7 pages.
Chinese Office Action for CN Application No. 2022108361905 dated Jul. 20, 2023 and English Translation, 31 pages.

* cited by examiner

SCRIM LAYER ON INSULATION

CROSS REFERENCE TO RELATED APPLICATIONS

This application claims the benefit of U.S. provisional application Ser. No. 63/225,220, filed Jul. 23, 2021, the disclosure of which is hereby incorporated in its entirety by reference herein.

TECHNICAL FIELD

The present disclosure relates to a layered composite, and more particularly, to an insulation layer with a support layer attached thereto.

BACKGROUND

Insulation, such as fiberglass insulation, is used in many household appliances that require high thermal loads, such as ovens, stoves, ranges, broilers, fireplaces, and the like. A flexible sheet of insulation is installed during assembly of the appliance to insulate components of the appliance from the heat being generated by the appliance. The insulation is typically formed as a flexible fiberglass sheet of inorganic glass fibers bonded with a thermoset resin. However, during handling during assembly and installation, small fiberglass particles may separate from the flexible sheet. Conventional fiberglass insulation sheets may include mechanical features for improving the retention of small fiberglass particles within the sheet, however the incorporation of the mechanical features may come at the cost of lower tensile strength. As such, the insulation may tear during installation in the appliance, and ease of handling of the flexible sheet during assembly may be compromised.

SUMMARY

According to one or more embodiments, a layered composite includes an insulation sheet and at least one scrim layer secured thereto. The at least one scrim layer may be embedded within the thickness of the insulation sheet, or bonded to a corresponding face of the insulation sheet. As such, the scrim layer provides structural support to the insulation sheet as well as a trap for fibers or particles, such as fiberglass particles, from the insulation sheet. Additional scrim layers may be included such that each face of the insulation sheet includes a scrim layer thereon, and/or there may be a plurality of scrim layers integrated into the thickness of the insulation sheet.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

According to one or more embodiments, a layered composite includes an insulation layer, such as a non-woven insulation sheet, which may be formed of a plurality of organic or inorganic fibers and/or particles (e.g., fiberglass, rockwool, mineral fiber, cellulose, foam, etc.), and at least one scrim layer for providing structural support to the insulation sheet and for trapping fiber and/or particles that may separate from the insulation sheet during handling and installation of the layered composite in a cooking appliance (e.g., a range, oven, broiler, etc.). The scrim layer may be bonded to the insulation sheet via a chemical or mechanical bond, for example the bonding agent used within the insulation sheet as a chemical bond, or another suitable agent, mechanism, or adhesive. The insulation sheet has a flexible body having a first face, and a second face, opposite the first face through the thickness of the body. The flexible body has a peripheral edge defined about the flexible body corresponding to the thickness of the insulation sheet. The at least one scrim layer is bonded to at least a portion of one face of the insulation sheet such that scrim layer traps fibers or particles that separate from the insulation sheet during handling and/or assembly. Furthermore, the scrim layer provides a structural support for the insulation sheet to prevent tearing of the insulation sheet during installation. In another embodiment, the scrim layer may be embedded within the insulation sheet to provide structural support for the insulation sheet such that the layered composite has a thickness of insulation on either side of the scrim layer.

According to one or more embodiments, a method of forming the layered composite includes bonding a scrim layer to at least one face of an insulation sheet. The bonding may be via a chemical bonding agent or via a mechanical bond, such as, for example, an adhesive bond. In yet another embodiment, a method of forming the layered composite includes forming the insulation sheet on either side of a scrim layer such that the scrim layer is embedded within the insulation sheet.

Figure 1:
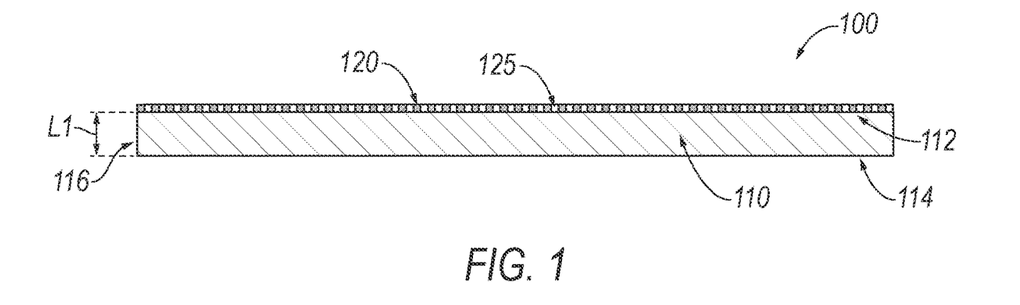
FIG. 1 is a schematic cross section of a layered composite, according to an embodiment.

Referring to FIG. 1, a layered composite 100 is shown, according to an embodiment. The layered composite 100 includes an insulation sheet 110. The insulation sheet 110 is a flexible sheet formed with a suitable insulation material, such as, but not limited to, fiberglass, rockwool, mineral, cellulose, foam, or combinations thereof. Although hereinafter insulation sheet may be referred to interchangeably as a fiberglass insulation sheet 110, with reference to fiberglass fibers or particles, this is not intended to be limiting, and the embodiments of the present disclosure pertain to other types of insulation with fibers or particles that can separate from the insulation, as well as insulation that may tear during handling or installation. As such, the insulation sheet 110 may be a fiberglass insulation sheet 110 including inorganic glass fibers bonded with a thermoset resin, or another type of insulation, and reference to a fiberglass insulation sheet is not intended to be limiting. For example, the fiberglass insulation sheet 110 may be a commercially available fiberglass insulation sheet such as, but not limited to, Thermorange System® (TRS) Insulation or TRS Insulation with PureSolution® Technology (TRSPST & GEM®), sold by Owens Corning Inc. The insulation sheet 110 has a suitable thermal conductivity to insulate heating elements and/or surfaces of an appliance (e.g., a stove, oven, broiler, etc.), and also has a suitable operating temperature range for the given appliance. For example, the operating temperature may be up to 537.8 degrees C., in some embodiments. The insulation sheet 110 has a first face 112 and a second face 114, opposite the first face 112, with a thickness L1 therethrough. The insulation sheet 110 also has a peripheral edge 116 defined around the insulation sheet 110, corresponding to the thickness L1 of the insulation sheet 110. The insulation sheet 110 may have any suitable thickness during assembly for ease of handling and ultimately insulating a portion of the appliance. In certain embodiments, the insulation sheet 110 has a thickness during assembly of 12.7 to 127 mm, in other embodiments 19.05 to 127 mm, and in yet further embodiments 25.4 to 76.2 mm.

The layered composite 100 further includes a scrim layer 120 on the first face 112 of the insulation sheet 110. The scrim layer 120 provides structural support to the insulation sheet 110. As such, the scrim layer 120 may be, in some embodiments, more rigid than the fiberglass insulation sheet 110 (i.e., has a tensile strength greater than the insulation sheet and thus having less propensity to tear while maintaining flexibility) However, the scrim layer 120 may be flexible enough to allow for handling and installation of the layered composite 100 within an appliance. The scrim layer 120 may be a woven, non-woven, or mesh layer having voids 125 defined within and/or through the thickness of the scrim layer 120. The voids 125 within the scrim layer 120 allow for particles or fibers from the insulation sheet 110 to be trapped within the scrim layer 120, while also providing structural support to the layered composite 100 and maintaining flexibility of the layered composite 100 for installation within the appliance. The scrim layer 120 may be made of any suitable material, including, but not limited to, a metal, fabric, fiberglass, or other polymer material that can sustain the operating environment of the appliance, such that it does not burn or otherwise deteriorate within the appliance. In certain embodiments, the scrim layer 120 is aluminum. In other embodiments, the scrim layer 120 is a woven fiberglass fabric or mesh. In further embodiments, the scrim layer 120 may be a loosely woven layer. The weave of the scrim layer 120 may be any suitable amount, as measured by yarns per inch. In some embodiments the yarn density of the scrim layer 120 is selected based on maintaining the flexibility of the insulation sheet 110 such that it can be easily maneuvered along surfaces of the appliance during installation, while providing structural support to reduce tearing of the insulation sheet during the installation. Moreover, the void content of the scrim layer 120 may be any suitable amount as based on the particle or fiber size of the insulation sheet such that the scrim layer 120 can trap at least 10% of fibers or particles that separate from the insulation sheet 110. In certain embodiments, the scrim layer 120 traps 10% to 95% of the fibers or particles, and in yet other embodiments, the scrim layer 120 traps 25% to 75% of the fibers or particles that separate from the insulation sheet 110.

Although shown on the first face 112, the scrim layer 120 may be on the second face 114, and depiction of the scrim layer 120 being on the first face 112 is not intended to be limiting. Additionally, the scrim layer 120 may only contact a portion of the first face 112, and need not cover the entire surface area of the first face 112. As such, the scrim layer 120 may only cover a portion of the surface of the first face 112 to trap particles or fibers and provide improvement in ease of handling. In some embodiments, the scrim layer 120 may cover at least 10% of the surface area of the first face 112, in other embodiments, may cover at least 25% of the surface area of the first face 112, and in yet further embodiments, may cover at least 50% of the surface area of the first face. In some embodiments, the scrim layer 120 may be positioned only a portion of the surface area where structural support is needed, such around the periphery of the insulation sheet 210, or around cut holes (e.g., as a grommet around the cut holes). Moreover, in some embodiments, the scrim layer 120 may be positioned on the face of the fiberglass insulation sheet 110 opposite from the face that would contact a surface of the appliance upon installation. For example, for the embodiment shown in FIG. 1, the second face 114 of the fiberglass insulation sheet 110 would contact a surface of the appliance, such that the scrim layer 120 can support the fiberglass insulation sheet 110 while it is being installed, and be the outer layer to trap fibers or particles within the scrim layer to improve handling of the layered composite 100. The scrim layer 120 may have any suitable thickness for supporting the insulation sheet 110 while maintaining flexibility of the insulation sheet 110 for ease of handling during handling and during installation, without compromising the insulative performance of the layered composite 100 within the appliance. As such, the thickness of the scrim layer 120 may be selected based on the cavity size of the appliance where the layered composite 100 is to be installed, and without significantly impacting the thermal performance of the layered composite 100 (as compared to only an insulation sheet 110 being present in the cavity of the appliance). For example, in some embodiments, the scrim layer 120 may have a thickness of up to 5 mm, in other embodiments, up to 2.5 mm, and in yet other embodiments, up to 1 mm. In certain embodiments, the scrim layer 120 may be thinner than the thickness L1 of the insulation sheet 110.

In one or more embodiments, the scrim layer 120 may be bonded, or otherwise secured or attached, to the insulation sheet 110 by any suitable chemical or mechanical bond or fastener, including, but not limited to, an adhesive, a binder or other bonding agent, welding (e.g., RF welding), or other suitable chemical or mechanical attachment or fastener (e.g., felting or interlocking to join the layers). In at least one embodiment, the scrim layer 120 may be chemically bound via a binding agent to attach the scrim layer 120 to the insulation sheet 110. In further embodiments, the binding agent may be a similar thermoset resin used to form the insulation sheet 110, e.g., the thermoset resin used in a fiberglass insulation sheet 110. In other embodiments, the scrim layer 120 may be secured via an adhesive or other binding agent that can withstand the operating conditions of the appliance, or can burn off without impacting performance of the appliance. In some embodiments, the binding agent or adhesive may be able to sustain (e.g., not melt and/or fail) at the same or similar operating temperatures as the fiberglass insulation sheet 110. In other embodiments, the bonding agent may burn off at temperatures reached within the appliance during operation, leaving the scrim layer 120 within an interference fit between the first face 112 of the insulation sheet 110 and a surface of the cavity of the appliance in which the layered composite 100 is installed.

Figure 2:
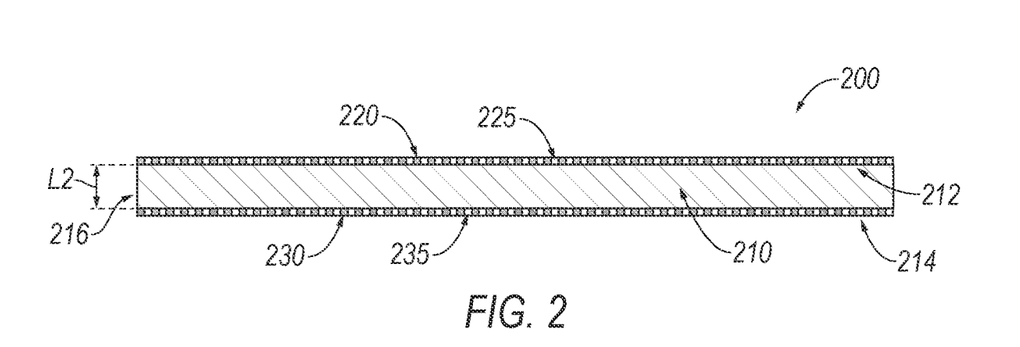
FIG. 2 is a schematic cross section of a layered composite, according to another embodiment.

Referring to FIG. 2, a layered composite 200 is shown, according to another embodiment. Similar reference numerals are used hereinafter for similar components. However, further detail and/or variations are provided for the layered composite 200. The layered composite 200 includes an insulation sheet 210 (e.g., a fiberglass insulation sheet 210, referred to interchangeably hereinafter). The insulation sheet 210 is a flexible sheet formed of a suitable insulation material, such as fiberglass, rockwool, mineral fiber, cellulose, foam, or other material that may have fibers or particles that can detach from the insulation sheet 210 during handling and/or assembly. In some embodiments, the insulation sheet 210 may be a fiberglass insulation sheet with inorganic glass fibers bonded with a thermoset resin. For example, the fiberglass insulation sheet 210 may be a commercially available fiberglass insulation sheet as previously described. The insulation sheet 210 has a suitable thermal conductivity to insulate heating elements and/or surfaces of an appliance (e.g., a stove, oven, broiler, etc.), and also has a suitable operating temperature range for the given appliance. For example, the operating temperature may be up to 537.78 degrees C., in some embodiments. Similar to the layered composite 100 of FIG. 1, the insulation sheet 210 of the layered composite 200 has a first face 212 and a second face 214, opposite the first face 212, with a thickness L2 therethrough. The insulation sheet 210 also has a peripheral edge 216 defined around the insulation sheet 210, corresponding to the thickness L2 of the insulation sheet 210. The insulation sheet 210 may have any suitable thickness during assembly for ease of handling and ultimately insulating a portion of the appliance as based on performance requirements of the layered composite 200. In certain embodiments, the insulation sheet 210 has a thickness during handling and/or assembly of 12.7 to 127 mm, in other embodiments 19.05 to 127 mm, and in yet further embodiments 25.4 to 76.2 mm.

The layered composite 200 further includes a first scrim layer 220 on the first face 212 of the insulation sheet 210, and a second scrim layer 230 on the second face 214 of the insulation sheet 210. The first and second scrim layers 220, 230 may cover at least a portion of the respective faces 212, 214, as discussed with respect to layered composite 100. Each of the first and second scrim layers 220, 230 (collectively, scrim layers 220, 230) provides structural support to the insulation sheet 210. As such, each of the scrim layers 220, 230 may be, in some embodiments, more rigid than the fiberglass insulation sheet 210. However, the scrim layers 220, 230 may each be flexible enough to allow for handling and installation of the layered composite 200 within an appliance. The scrim layers 220, 230 may be woven, nonwoven, or mesh layer having voids 225, 235 defined within and/or through the thickness of the serim layers 220, 230. The voids 225, 235 within the scrim layers 220, 230 allow for fibers or particles from the insulation sheet 210 to be trapped within the scrim layers 220, 230, while also providing structural support to the layered composite 200 and maintaining flexibility of the layered composite 100 for installation within the appliance. The scrim layers 220, 230 may be made of any suitable material, including, but not limited to, a metal, fabric, fiberglass, or other polymer material that can sustain the operating environment of the appliance, such that it does not burn or otherwise deteriorate within the appliance or impact performance of the insulation. In certain embodiments, the scrim layers 220 are aluminum. In other embodiments, the scrim layers 220, 230 are a woven fiberglass fabric or mesh. In further embodiments, the scrim layers 220, 230 may be loosely woven layers. The weave of the scrim layers 220, 230 may be any suitable amount, as measured by yarns per inch. In some embodiments the yarn density of the scrim layers 220, 230 is selected based on maintaining the flexibility of the insulation sheet 210 such that it can be easily maneuvered along surfaces of the appliance during installation, while providing structural support to reduce tearing of the insulation sheet during the installation. Moreover, the void content of the scrim layers 220, 230 may be any suitable amount as based on the particle or fiber size of the insulation sheet 210 such that the scrim layers 220, 230 can trap at least 10% of fibers or particles that separate from the insulation sheet 210. In certain embodiments, the scrim layers 220, 230 individually or collectively trap 10% to 95% of the fibers or particles, and in yet other embodiments, 25% to 75% of the fibers or particles that separate from the insulation sheet 210. The scrim layers 220, 230 may each have any suitable thickness for supporting the insulation sheet 210 while maintaining flexibility of the insulation sheet 210 for ease during handling and during installation, without compromising the insulative performance of the layered composite 200 within the appliance. As such, the thickness of each of the scrim layers 220, 230 may be selected based on the cavity size of the appliance where the layered composite 200 is to be installed, and without significantly impacting the thermal performance of the layered composite 200 (as compared to only an insulation sheet 210 being present in the cavity of the appliance) For example, in some embodiments, the scrim layers 220, 230 each may have a thickness of up to 5 mm, in other embodiments, up to 2.5 mm, and in yet other embodiments, up to 1 mm. In certain embodiments, the scrim layers 220, 230 may be thinner than the thickness L2 of the insulation sheet 210.

Each of the first and second scrim layers 220, 230 may be a similar scrim layer, or be a different scrim layer. For example, the first scrim layer 220 may be a first material, type of scrim, density, or thickness, and cover a certain portion of the first face 212, and the second scrim layer 230 may be a different material, type of scrim, density, or thickness, or cover a different portion of the second face 214, or combinations thereof. As such, the scrim layers 220, 230 need not be identical, and may have varying properties as selected based on the side of the layered composite 200. For example, the operating temperature of the first scrim layer 220 may be different from the second scrim layer 230, as based on its position within the appliance and its exposure to heat. In another example, the first scrim layer 220 may cover at least 10% of the surface area of the first face 212, while the second scrim layer 230 may only be positioned on the second face 214 around cut holes as grommets to support the cut holes. As such, each scrim layer may independently be positioned and provide surface area coverage as based on the desired design of the layered composite and where structural support and traps for separating particles are needed. Moreover, although shown as generally having similar thicknesses, this is not intended to be limiting, and each of the first and second scrim layers 220, 230 may have different thicknesses. For example, the thickness of each scrim layer 220, 230 may be based on the side of the layered composite 200 to be in contact with a surface of the appliance upon installation. Furthermore, each scrim layer 220, 230 may be a different material. For example, the first scrim layer 220 may be an aluminum scrim layer, while the second scrim layer 220 may be a fiberglass scrim layer. As such, the scrim layers 220, 230 need not be similar or identical, and may be selected based on various factors such as but not limited to the structural support required on the side of the fiberglass insulation sheet, the temperature requirements of the scrim layers as based on the position in the appliance/exposure in the appliance, and the like.

In one or more embodiments, each of the scrim layers 220, 230 may be bonded, or otherwise secured or attached, to the insulation sheet 210 by any suitable chemical or mechanical bond or fastener, including, but not limited to, an adhesive, a binder or other bonding agent, welding (e.g., RF welding), or other suitable chemical or mechanical attachment or fastener (e.g., felting or interlocking to join the layers). In at least one embodiment, the scrim layers 220, 230 may be chemically bound via a binding agent to attach the scrim layers to the insulation sheet 210. In further embodiments, the binding agent may be a similar thermoset resin used to form the insulation sheet 210, e.g., the thermoset resin used in a fiberglass insulation sheet 210. In other embodiments, the scrim layers 220, 230 may be secured via an adhesive or other binding agent that can withstand the operating conditions of the appliance, or can burn off without impacting performance of the appliance. In some embodiments, the binding agent or adhesive may be able to sustain (e.g., not melt and/or fail) at the same or similar operating temperatures as the fiberglass insulation sheet 210. In other embodiments, the bonding agent may burn off at temperatures reached within the appliance during operation, leaving the scrim layers 220, 230 within an interference fit (i.e., sandwiched) between the first face 212 and second face 214 of the insulation sheet 210 and a respective surface or wall of the cavity of the appliance in which the layered composite 200 is installed.

Figure 3:
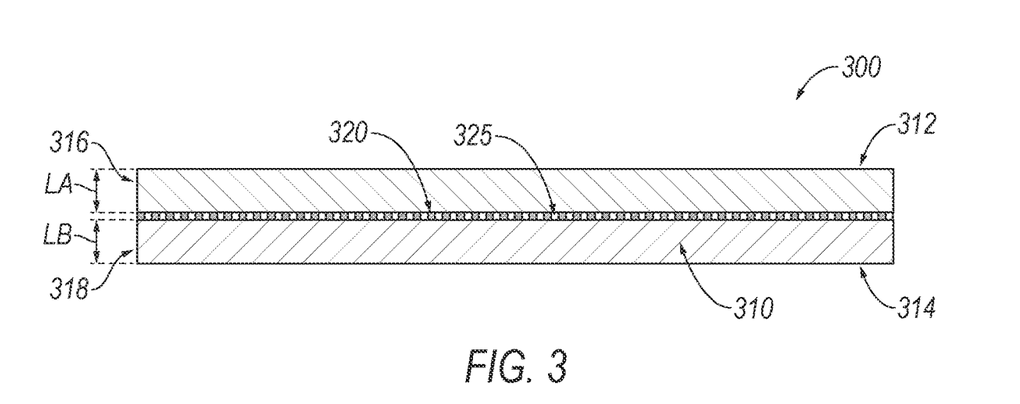
FIG. 3 is a schematic cross section of a layered composite, according to yet another embodiment.

Referring to FIG. 3, a layered composite 300 is shown, according to another embodiment. Similar reference numerals are used hereinafter for similar components. However, further detail and/or variations are provided for the layered composite 300. The layered composite 300 includes an insulation sheet 310 of a suitable insulation material, as previously discussed, such that it is comprised of a material that may have fibers or particles that separate during handling or assembly/installation. The insulation sheet 310 has a suitable thermal conductivity to insulate heating elements and/or surfaces of an appliance (e.g., a stove, oven, broiler, etc.), and also has a suitable operating temperature range for the given appliance. Similar to the layered composite 100 of FIG. 1 and the layered composite 200 of FIG. 2, the insulation sheet 310 of the layered composite 300 has a first face 312 and a second face 314, opposite the first face 312, with first and second regions 316, 318 defined by thicknesses LA and LB, respectively. The fiberglass insulation sheet 310 may have any suitable overall thickness during assembly for ultimately insulating a portion of the appliance. In certain embodiments, the fiberglass insulation sheet 310 has a thickness of 12.7 to 127 mm, in other embodiments 19.05 to 127 mm, and in yet further embodiments 25.4 to 76.2 mm.

The layered composite 300 further includes a scrim layer 320 within the thickness of the insulation sheet 310. The scrim layer 320 provides structural support to the insulation sheet 310. As such, the scrim layer 320 may be, in some embodiments, more rigid than the fiberglass insulation sheet 310. However, the scrim layer 320 may be flexible enough to allow for handling and installation of the layered composite 300 within an appliance. For example, the insulation sheet 310 may be sufficiently maneuverable for installation over surfaces of the appliance, without the scrim layer 320 compromising the maneuverability or tensile strength of the insulation sheet 310. The scrim layer 320 may be woven, non-woven, or mesh layer having voids 325 defined within and/or through the thickness, as previously described. The voids 325 within the scrim layer 320 allow for particles or fibers from the insulation sheet 310 to be trapped within the scrim layer 320, while providing structural support to the layered composite 300. The scrim layer 320 may be made of any suitable material and have any suitable dimension, as previously discussed with respect to the layered composites 100, 200.

The scrim layer 320 is positioned within the thickness of the fiberglass insulation sheet 310 such that the scrim layer 320 is between the first region 316 and the second region 318 of the fiberglass insulation sheet 312. Although described as a single insulation sheet with the scrim layer integrated therein, the insulation sheet 310 may be formed of two components forming the first region 316 and the second region 318, such that the scrim layer 320 can be sandwiched therebetween. Where the insulation sheet 320 is formed of two components, the scrim layer 320 may be bonded by a chemical or mechanical bond to the insulation sheet 320 on either side by a suitable mechanism, as previously described with respect to the layered composites 100, 200. The scrim layer 320 may be positioned within the insulation sheet 310 such that the first region 316 has a thickness LA, and the second region 318 has a thickness LB. Although shown as generally similar, the thicknesses LA and LB of the first and second regions 316, 318 need not be similar, and may be based on the requirements of the appliance, for example, which side of the layered composite 300 is contacting a surface of the appliance, and the thermal requirements of the layered composite 300 based on its position and orientation therein.

In one or more embodiments, the scrim layer 320 may be embedded within the fiberglass insulation sheet 310, such as by forming the fiberglass insulation sheet 310 on the scrim layer 320. In other embodiments, the insulation sheet 310 may be cut via an air knife, for example, and the scrim layer 320 may be inserted during the air knife process. In another embodiment, where the first and second regions 316, 318 are separate components, the first and second regions 316, 318 may be bonded, or otherwise secured to, to the scrim layer 320 and/or each other within the voids 325 of the scrim layer 320. The securing of the scrim layer 320 to the fiberglass insulation sheet 310, and of the first region 316 to the second region 318 where the regions are separate components, may be any suitable attachment, including, but not limited to, a chemical or mechanical bonding agent, or adhesive, welding, RF welding, or other suitable chemical or mechanical attachment or fastener as previously described. In some embodiments, the bonding agent or adhesive may be able to sustain (e.g., not melt and/or fail) at the same or similar operating temperatures as the fiberglass insulation sheet 310. In other embodiments, the bonding agent or adhesive may burn off at temperatures reached within the appliance during operation, leaving the scrim layer 320 mechanically integrated within the insulation 320 such that the layered composite 300 is held via interference fit between surfaces of the appliance.

Figure 4:
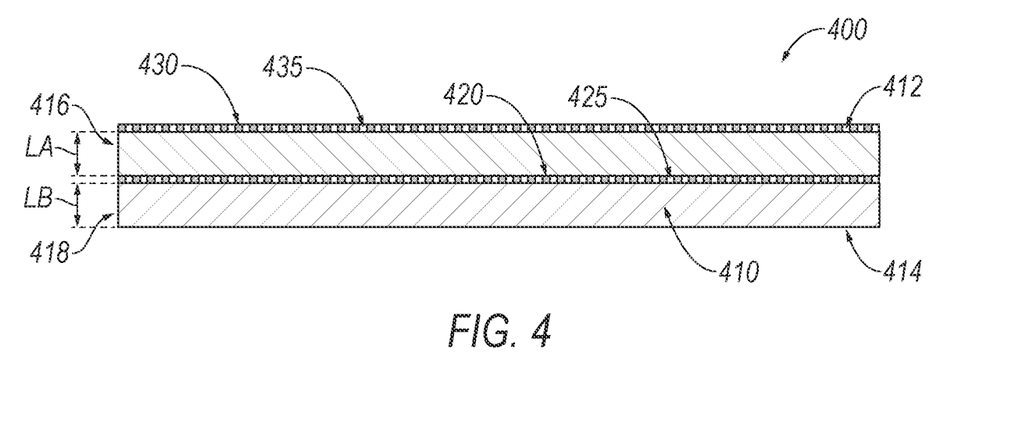
FIG. 4 is a schematic cross section of a layered composite, according to yet another embodiment.

Referring to FIG. 4, a layered composite 400 is shown according to another embodiment. Similar reference numerals will be used as discussed above with respect to FIGS. 1-3, with additional detail and variation being described in detail hereinafter. The layered composite 400 is similar to layered composite 300, where the insulation sheet 410 includes a first scrim layer 420 embedded and/or positioned within the insulation sheet 410, with first region 416 and second region 418 on either side of the scrim layer 420. The layered composite 400 further includes a second scrim layer 430 on the first face 412 of the insulation sheet 410. As such, the layered composite 400 includes the second scrim layer 430, as similar to the scrim layer 120 of the layered composite 100 (as shown in FIG. 1), as well as the first scrim layer 420 within the thickness of the fiberglass insulation sheet 410. As such, the scrim layers 420, 430 provide structural support for the layered composite 400 and also can trap fibers and/or particles within the voids 425, 435 defined in the scrim layers 420, 430.

Figure 5:
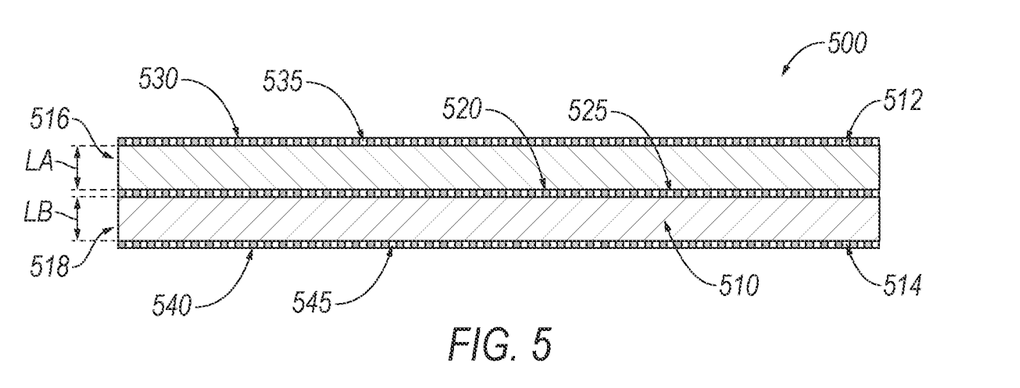
FIG. 5 is a schematic cross section of a layered composite, according to yet another embodiment.

Referring to FIG. 5, a layered composite 500 is shown according to yet another embodiment. Similar reference numerals will be used as discussed above with respect to FIGS. 1-4, with additional detail and variation being described in detail hereinafter. The layered composite 500 is similar to layered composite 300, where the insulation sheet 510 includes a first scrim layer 520 embedded and/or positioned within the insulation sheet 510, with first region 516 and second region 518 on either side of the scrim layer 520. The layered composite 500 further includes a second scrim layer 530 on the first face 512 of the insulation sheet 510, and a third scrim layer 540 on the second face 514 of the insulation sheet 510. As such, the layered composite 500 includes the second scrim layer 530 and the third scrim layer 540, as similar to the scrim layers 220, 230 of the layered composite 200 (as shown in FIG. 2), as well as the first scrim layer 520 within the thickness of the fiberglass insulation sheet 510. As such, the scrim layers 520, 530, 540 provide structural support for the layered composite 500 and also can trap fibers and/or particles within the voids 525, 535, 545 defined in the scrim layers 520, 530, 540.

Although each layered composite 100, 200, 300, 400, 500 include only a single scrim layer at each position, it is further contemplated that the layered composites may include a plurality of scrim layers at each position. For example, in embodiments where the scrim layers are within the thickness of the insulation sheet, there may be one or more scrim layers embedded therein to form regions of varying or constant thickness therethrough. Thus, additional support can be provided, as well as additional traps for fibers and particles. However, the additional layers of the scrim, and in embodiments with multiple scrim layers, do not compromise the performance of the insulation within the appliance, and as such, in some embodiments, may be sufficiently thin to maintain the amount of insulation that is being installed in the appliance. Thus, additional layers of scrim are contemplated without compromising performance of the insulation or the ability to install (as relevant to thickness) of the layered composites for assembly of the appliance.

A method of forming a layered composite includes forming an insulation sheet, and securing at least one scrim layer thereto. The scrim layer may be positioned on a portion of a face of the insulation sheet, or embedded therein. The method may further include forming the insulation sheet on the scrim layer such that the scrim layer is embedded therein, with a thickness of the insulation on either side. The forming may include using an air knife to separate the insulation sheet and install the scrim layer therebetween. The thickness on either side may be the same, or may be different. Moreover, where the scrim layer(s) are attached to the face(s) of the insulation sheet, the method may include bonding the scrim layer(s) to the face(s) via a chemical or mechanical bond (e.g., via a bonding agent and/or an adhesive). The method may also include forming the insulation sheet on the scrim layer, and further bonding at least one additional scrim layer to at least one face of the insulation sheet.

Except where otherwise expressly indicated, all numerical quantities and ranges in this disclosure are to be understood as modified by the word "about". Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

This disclosure is not limited to the specific embodiments and methods described below, as specific components and/or conditions may vary. Furthermore, the terminology used herein is used only for the purpose of describing particular embodiments of the present disclosure and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

While exemplary embodiments are described above, it is not intended that these embodiments describe all possible forms encompassed by the claims. The words used in the specification are words of description rather than limitation, and it is understood that various changes can be made without departing from the scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on specific application and implementation. These attributes can include, but are not limited to cost, strength, durability, life cycle cost, marketability, appearance, packaging size, serviceability, weight, manufacturability, ease of assembly, etc. As such to the extent any such embodiments are described as less desirable than other embodiments or prior art implementations with respect to one or more characteristics, these embodiments are not outside the scope of the disclosure and can be desirable for particular applications.

What is claimed is:

1. A layered composite for installation over a surface comprising:
   a fiberglass insulation sheet having a first face and a second face opposite the first face, and defining a thickness therebetween, the fiberglass insulation sheet including particles or fibers that are detachable to form detached particles or fibers, wherein the fiberglass insulation sheet has a thickness of 19.05 mm to 127 mm;
   a first aluminum scrim layer secured a corresponding face of the first face and the second face, and the first fiberglass scrim layer being a woven or mesh defining voids therein and having a tensile strength greater than a fiberglass insulation sheet tensile strength to provide support to the fiberglass insulation sheet during handling and installation; and
   a second aluminum scrim layer being a woven or mesh defining voids therein and having a tensile strength greater than the fiberglass insulation sheet tensile strength to provide support to the fiberglass insulation sheet during handling and installation, the second aluminum scrim layer embedded within the thickness of the insulation sheet such that the insulation sheet includes a first region and a second region defined on opposing sides, wherein the first and second regions of the fiberglass insulation sheet are bonded together within the voids to embed the second aluminum scrim layer in the fiberglass insulation sheet,
   wherein upon detachment of the particles or fibers from the fiberglass insulation sheet to form detached particles or fibers, the voids of the first and second aluminum scrim layers are sized to trap the detached particles or fibers from the fiberglass insulation sheet within the first and second aluminum scrim layers.

2. The layered composite of claim 1, wherein the thickness of fiberglass insulation sheet is 25.4 mm to 76.2 mm.

3. The layered composite of claim 1, wherein the first aluminum scrim layer traps 10% to 95% of the detached particles or fibers that have detached from the fiberglass insulation sheet.

4. The layered composite of claim 1, wherein the first aluminum scrim layer is secured via binding agent, adhesive, or mechanical fastener.

5. The layered composite of claim 1, wherein the first aluminum scrim layer is positioned on a portion of the corresponding face to cover at least 25% of the surface area of the corresponding face.

6. The layered composite of claim 1, further comprising a third scrim layer secured to another corresponding face of the first face and the second face, the third scrim layer defining voids therein sized to trap detached particles and fibers from the fiberglass insulation sheet within the voids of the third scrim layer and having a tensile strength greater than the fiberglass insulations sheet tensile strength to provide support to the fiberglass insulation sheet during handling and installation.

7. The layered composite of claim 6, wherein the third scrim layer is a fiberglass or aluminum scrim layer.

8. The layered composite of claim 7, wherein the fiberglass or aluminum scrim layer is a woven fabric or mesh.

9. The layered composite of claim 1, wherein the fiberglass insulation sheet comprises inorganic glass fibers bonded with a thermoset resin.

10. The layered composite of claim 1, wherein the first and second aluminum scrim layers are sufficiently flexible to allow the insulation sheet to be sufficiently maneuverable during installation over the surface while preventing or reducing tearing thereof.

11. The layered composite of claim 1, wherein the surface belongs to a heating element or an appliance.

12. The layered composite of claim 11, wherein the appliance is a cooking appliance.

13. A method of forming the layered composite of claim 1, the method comprising:
   providing the fiberglass insulation sheet;
   embedding the second aluminum scrim layer within the thickness of the fiberglass insulation sheet, and
   securing the first aluminum scrim layer on the corresponding face.

14. The method of claim 13, wherein the securing includes attaching the first aluminum scrim layer to the corresponding face via an adhesive, binding agent, or mechanical fastener.

15. The method of claim 13, wherein the embedding includes cutting the fiberglass insulation sheet with an air knife to separate the fiberglass insulation sheet and installing the second aluminum scrim layer therebetween.

* * * * *